(12) United States Patent
Kilian-Kehr

(10) Patent No.: US 8,146,100 B2
(45) Date of Patent: Mar. 27, 2012

(54) SYSTEM AND METHOD FOR EVENT-BASED INFORMATION FLOW IN SOFTWARE DEVELOPMENT PROCESSES

(75) Inventor: Roger Kilian-Kehr, Darmstadt (DE)

(73) Assignee: SAP AG, Walldorf (DE)

( * ) Notice: Subject to any disclaimer, the term of this patent is extended or adjusted under 35 U.S.C. 154(b) by 1692 days.

(21) Appl. No.: 11/386,335

(22) Filed: Mar. 21, 2006

(65) Prior Publication Data

US 2007/0226755 A1    Sep. 27, 2007

(51) Int. Cl.
  *G06F 3/00* (2006.01)
  *G06F 9/44* (2006.01)
  *G06F 15/16* (2006.01)
(52) U.S. Cl. ............... 719/318; 717/100; 709/204
(58) Field of Classification Search .......... None
  See application file for complete search history.

(56) References Cited

U.S. PATENT DOCUMENTS

| | | | |
|---|---|---|---|
| 5,287,504 A | 2/1994 | Carpenter et al. | |
| 5,557,730 A * | 9/1996 | Frid-Nielsen | 715/839 |
| 5,557,798 A | 9/1996 | Skeen et al. | |
| 5,625,818 A | 4/1997 | Zarmer et al. | |
| 5,717,614 A * | 2/1998 | Shah et al. | 702/119 |
| 5,781,911 A | 7/1998 | Young et al. | |
| 5,862,325 A | 1/1999 | Reed et al. | |
| 5,892,909 A | 4/1999 | Grasso et al. | |
| 5,913,032 A | 6/1999 | Schwartz et al. | |
| 5,974,417 A | 10/1999 | Bracho et al. | |
| 6,044,372 A | 3/2000 | Rothfus et al. | |
| 6,061,696 A | 5/2000 | Lee et al. | |
| 6,088,717 A | 7/2000 | Reed et al. | |
| 6,349,310 B1 | 2/2002 | Klein et al. | |
| 6,369,840 B1 | 4/2002 | Barnett et al. | |
| 6,408,291 B1 | 6/2002 | Skeen et al. | |
| 6,412,021 B1 * | 6/2002 | Nguyen et al. | 719/318 |
| 6,434,568 B1 | 8/2002 | Bowman-Amuah et al. | |
| 6,442,565 B1 | 8/2002 | Tyra | |
| 6,446,136 B1 | 9/2002 | Pohlmann et al. | |
| 6,453,313 B1 | 9/2002 | Klein et al. | |
| 6,453,339 B1 | 9/2002 | Schultz et al. | |
| 6,477,580 B1 | 11/2002 | Bowman-Amuah | |
| 6,487,583 B1 | 11/2002 | Harvey et al. | |
| 6,502,093 B1 | 12/2002 | Bhatt et al. | |
| 6,513,019 B2 | 1/2003 | Lewis | |
| 6,519,629 B2 | 2/2003 | Harvey et al. | |
| 6,526,438 B1 | 2/2003 | Bienvenu et al. | |
| 6,567,796 B1 | 5/2003 | Yost et al. | |

(Continued)

OTHER PUBLICATIONS

Michael Louis Kantor, An Infrastructure for Supporting Ubiquitous Awareness Dissertation, 2001, published online before Feb. 1, 2005, [Retrieved online: http://web.archive.org/web/20050201012627/http://www.isr.uci.edu/projects/cassius/papers/Dissertation.pdf ], pp. 1-253.*

(Continued)

*Primary Examiner* — Tuan Dam
*Assistant Examiner* — Zheng Wei
(74) *Attorney, Agent, or Firm* — Schwegman, Lundberg & Woessner, P.A.

(57) ABSTRACT

A method including receiving a plurality of event descriptors, each event descriptor of the plurality of event descriptors corresponding to a respective event relevant to a software development process, transmitting the plurality of event descriptors to a subscriber; and receiving a subscription message from a subscriber, the subscription message including an indication of an event descriptor selected from the plurality of event descriptors.

28 Claims, 4 Drawing Sheets

U.S. PATENT DOCUMENTS

| | | |
|---|---|---|
| 6,567,846 B1 | 5/2003 | Garg et al. |
| 6,598,046 B1 | 7/2003 | Goldberg et al. |
| 6,604,093 B1 | 8/2003 | Etzion et al. |
| 6,636,886 B1 | 10/2003 | Katiyar et al. |
| 6,643,650 B1 | 11/2003 | Slaughter et al. |
| 6,643,661 B2 | 11/2003 | Polizzi et al. |
| 6,643,682 B1 | 11/2003 | Todd et al. |
| 6,697,810 B2 * | 2/2004 | Kumar et al. .................... 1/1 |
| 6,701,514 B1 | 3/2004 | Haswell et al. |
| 6,704,873 B1 | 3/2004 | Underwood |
| 6,728,715 B1 | 4/2004 | Astley et al. |
| 6,748,583 B2 | 6/2004 | Aizenbud-Reshef et al. |
| 6,757,689 B2 | 6/2004 | Battas et al. |
| 6,772,216 B1 | 8/2004 | Ankireddipally |
| 6,772,229 B1 | 8/2004 | Achacoso et al. |
| 6,788,939 B2 | 9/2004 | Truong et al. |
| 6,804,818 B1 | 10/2004 | Codella et al. |
| 6,807,558 B1 | 10/2004 | Hassett et al. |
| 6,817,010 B2 | 11/2004 | Aizenbud-Reshef et al. |
| 6,823,357 B1 | 11/2004 | Du et al. |
| 6,826,560 B1 | 11/2004 | Leymann et al. |
| 6,847,639 B2 * | 1/2005 | Barathan et al. ............. 370/389 |
| 6,907,546 B1 | 6/2005 | Haswell et al. |
| 6,910,070 B1 | 6/2005 | Mishra et al. |
| 6,915,519 B2 | 7/2005 | Williamson et al. |
| 6,941,375 B1 | 9/2005 | Govindarajan et al. |
| 6,944,864 B2 | 9/2005 | Kumar |
| 6,954,757 B2 | 10/2005 | Zargham et al. |
| 6,970,842 B1 | 11/2005 | Ashby |
| 6,971,065 B2 | 11/2005 | Austin |
| 6,971,096 B1 | 11/2005 | Ankireddipally et al. |
| 7,024,451 B2 * | 4/2006 | Jorgenson .................... 709/203 |
| 7,302,643 B1 * | 11/2007 | Edlund et al. ................ 715/703 |
| 7,478,401 B2 * | 1/2009 | Irassar et al. .................. 719/313 |
| 7,559,065 B1 * | 7/2009 | Sosnovsky et al. ........... 719/318 |
| 7,657,450 B2 * | 2/2010 | Amit et al. .................... 705/7.26 |
| 2002/0067818 A1 * | 6/2002 | Barathan et al. ............. 379/219 |
| 2002/0116248 A1 * | 8/2002 | Amit et al. ......................... 705/9 |
| 2002/0154010 A1 * | 10/2002 | Tu et al. ........................ 340/517 |
| 2002/0156785 A1 * | 10/2002 | Kumar et al. ................... 707/10 |
| 2003/0004974 A1 * | 1/2003 | Wang et al. ................... 707/200 |
| 2003/0105801 A1 * | 6/2003 | Tse et al. ...................... 709/202 |
| 2003/0105805 A1 * | 6/2003 | Jorgenson .................... 709/203 |
| 2004/0064387 A1 * | 4/2004 | Clarke et al. ................... 705/34 |
| 2005/0075095 A1 * | 4/2005 | Dillon ........................ 455/412.2 |
| 2006/0155581 A1 * | 7/2006 | Eisenberger et al. ............. 705/3 |
| 2008/0288466 A1 * | 11/2008 | Eisenberger et al. ............. 707/3 |

OTHER PUBLICATIONS

Eugster, Patrick T., "The Many Faces of Publish/Subscribe", *ACM Computing Surveys*, 35(2), (Jun. 2003),114-131.

"Partial European Search report and communication, Application No. 07002743,", (May 16, 2007),11 pgs.

Silva Fiho, Roberto , et al., "Striving for versatility in publish/subscribe infrastructures", *Proceedings of the 5th international workshop on Software engineering and middleware*, (2005),17-24.

Kantor, Michael , et al., "Designing dynamic subscription and awareness services", Institute for Software Research. University of California, Irvine, (2002),7 pgs.

Preston, Jon A., "Configuration management and distributed software engineering", *Clayton State University PhD thesis*, (Spring 2005),24 pgs.

Vinoski, Steve , "Web services notifications", *IEEE Internet Computing*, (2004),86-90.

* cited by examiner

SYSTEM AND METHOD FOR EVENT-BASED INFORMATION FLOW IN SOFTWARE DEVELOPMENT PROCESSES

TECHNICAL FIELD

The present disclosure relates to a method for facilitating collaboration and cooperation in software development processes, and, in one example embodiment, to a method for using the publish/subscribe pattern to allow stakeholders in a software development process to trace and follow the creation, deletion, and update of development artifacts.

BACKGROUND

In medium- and large-scale software development, it often happens that a team comprising a number of people, having different skill sets and responsibilities, need to collaborate to successfully develop and deliver a software product. This team can include programmers and engineers, database developers, software architects, build mangers, requirements analysts, and project managers.

In order to successfully develop software, many different types of data objects (called "development artifacts") must be created, maintained, and modified by the various members of the software development team. These data objects can include files and directories on computer systems, database file stores, source code files, files describing software models, requirements analysis documents, detailed technical specifications, and the like. During the software development process, these artifacts are subject to constant change and modification. For example, a source code file in a source code repository will be expanded, modified, created or even deleted by a programmer. Another example is that of a requirements document, which can be modified by a requirements analyst based on new information from a customer or a marketing professional. Often, a member of the team will need to be made aware of the modification of an artifact by another member of team. For example, a programmer will need to know when a key software specification document has been modified to include a new feature, so that the programmer can update some of the source code to implement that feature. In another example, a build manager, who is responsible for building and configuring executables for the software under development will need to know when new modules of source code have been added to the source code repository, so that he or she can modify the build process to include the new modules. Finally, a software architect, using a modeling tool, may update the definitions of class hierarchies being used in a project—a programmer may wish to know of this modification to allow him or her to modify some piece of source code to use the new interfaces available in the modified class hierarchies.

In addition to creation, deletion, and modification of development artifacts, there are many other events that various members of a team may wish to become aware of. For example, a software quality assurance tester may wish to know when a build process, possibly initiated by a build manager, has completed so that the tester can begin testing the latest version of the software.

In former times, the need for various members of a software development team to be quickly aware of artifact modification and other events was less, because of the segmented nature of the software development process in which ideally, for example, a requirements document would be completed and unlikely to be modified while engineers and programmers implemented the software specified therein. In modern "agile" software development processes, the workflow interrelating the various stages and procedures on the software development process is much more complex and organic. Therefore, a timely flow of information about the changes occurring in development artifacts (which are the physical representations of the workflow of the development process) as well as the occurrence of other significant events in the development process is crucial for effective and efficient collaboration among the team members. In addition, it is now often the case the members of the team are distributed around the world and that geographical distribution, coupled with the sheer complexity of modern software engineering projects can make it difficult for team members to keep one another apprised of the modifications and events using the conventional expedients of in-person discussions, phone calls, or even email. There is now a great need for automated processes to mediate the timely flow of information about changes in development artifacts and other related events.

BRIEF DESCRIPTION OF THE DRAWINGS

Embodiments are illustrated by way of example and not limitation in the figures of the accompanying drawings, in which like references indicate similar elements and in which.

Figure 1:
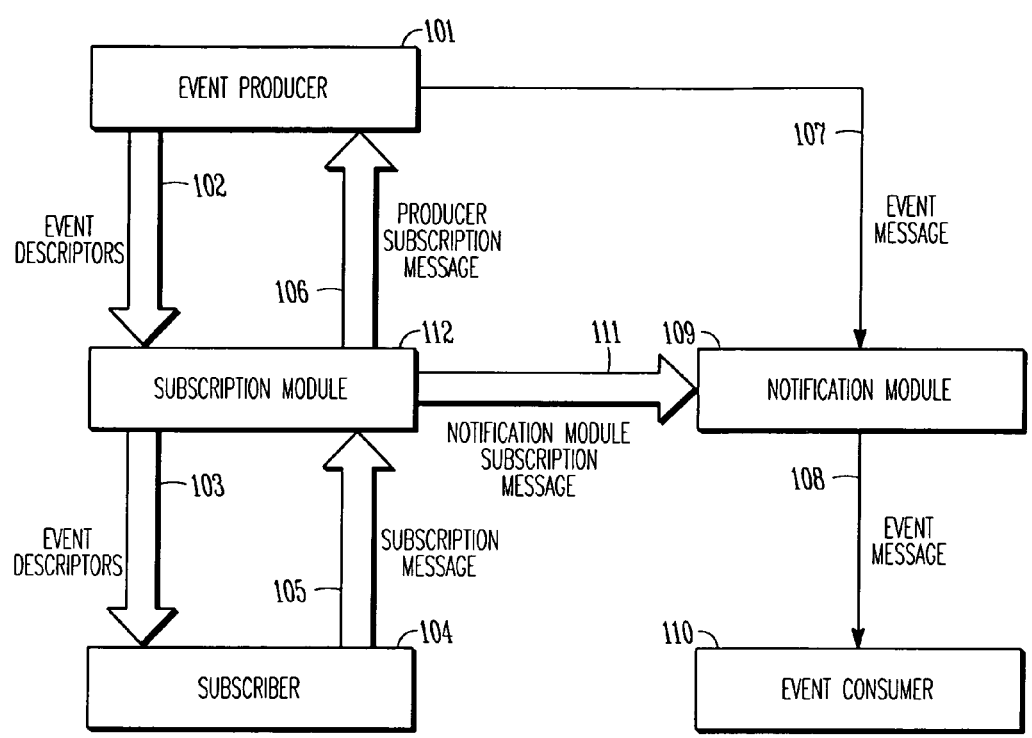
FIG. 1 shows a block diagram illustrating the architecture of a publish/subscribe notification system for use in implementing event-based information flow in a software development environment, according to an example embodiment.

| DRAWINGS - Reference numerals | |
|---|---|
| 101 | event producer |
| 102 | message containing event descriptors transmitted by event producer |
| 103 | message containing event descriptors transmitted by subscription module |
| 104 | subscriber |
| 105 | subscription message |
| 106 | producer subscription message |
| 107 | event message transmitted by event producer |
| 108 | event message transmitted by notification module |
| 109 | notification module |
| 110 | event consumer |
| 111 | notification module subscription message |
| 112 | subscription module |
| 201 | network |
| 202 | main bus of machine to implement subscription module |
| 203 | memory containing processor-executable programs |
| 204 | network interface |
| 205 | processor |
| 206 | machine implementing subscription module |
| 207 | processor-executable programs |
| 208 | main bus for machine implementing event producer |
| 209 | network interface of machine to implement event producer |
| 210 | processor of machine to implement event producer |

-continued

DRAWINGS - Reference numerals

- 211 memory containing processor-executable programs for machine to implement event producer
- 212 machine to implement event producer
- 213 machine to implement notification module
- 214 network interface of machine to implement event producer
- 215 processor of machine to implement event producer
- 216 memory of machine to implement event producer
- 301 subscriber timeline
- 302 subscription module timeline
- 303 timeline of event producer
- 304 notification module timeline
- 305 event consumer timeline
- 306 message containing plurality of available event descriptors transmitted to subscription module
- 307 message containing plurality of available event descriptors transmitted to subscriber
- 308 subscription message
- 309 producer subscription message
- 310 notification module subscription message
- 311 event message transmitted from event producer to notification module
- 312 event message transmitted from notification module to event consumer

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

Reference will be made to the several FIGS. 1-7 that depict example embodiments of a system and method for the creation and distribution of notification of events to various stakeholders using a publish/subscribe pattern. An example embodiment of the overall system is depicted in overview in FIG. 1, and is designated generally by the reference numeral 100.

In an example embodiment, the system 100 may comprise a number of components as shown in FIG. 1. A subscriber 104 may be a desktop computer, handheld computer, cell phone or other device that is capable of receiving messages via a network, presenting information to a user, receiving input from a user, and transmitting messages via a network. For the purposes of this specification a subscriber is such a machine, not a human user. A subscription module 112 is that combination of hardware and software that handles the placing of subscriptions. An event producer 101 is the combination of hardware and software that receives subscription messages and transmits event messages. A notification module 109 is the combination of hardware and software that receives event messages from an event producer 101 and in accordance with the subscriptions transmits event messages to an event consumer 110. An event consumer 110 is that combination of hardware and software that makes events manifest to users.

For the purpose of describing the information flows depicted in FIG. 1, a typical use case will now be presented. Initially, an event producer 101 may transmit a plurality of event descriptors 102 to a subscription module 112. Typically, these event descriptors 102 describe the kinds of events that the event producer 101 is capable of detecting or causing to occur, and consequently able to indicate detection or occurrence by the emission of specific messages ("event messages"). These event descriptors 102 may be of a specific nature, for example, where the event producer 101 is a software build tool, the event descriptors 102 may include the beginning and end of the build processes for software that the build tool is configured. In other embodiments, such as, for example, in which the event producer 101 is a source code control system, the events may be more complex, the plurality including the events of deletion or modification of a number of source code files and the event of an addition of a new source code file in a source code control system. It will be appreciated that many kinds of event producers may be developed having the capability of transmitting a number of event descriptors corresponding to events relevant to a software development process. In some embodiments, the system may include more than one event producer 101, capable of producing different events. In that case, the subscription module 112 may be configured to receive multiple event descriptors from all of the various event producers 101. Typically, the various event producers 101 in the system may be configured with sufficient routing information to allow them to transmit their pluralities of event descriptors to the subscription module 112. Numerous further examples of specific event producers 101 and the events that they may be able to detect or cause will be described below.

The event descriptors are included in what may be termed a publication policy for an event producer 101.

Having received the event descriptors of events 102 from the event consumer, the subscription module 112 may aggregate them together with other event descriptors, categorized by the event producer 101 able to produce the corresponding event messages. This aggregated collection or data structure is then available as a basis for subscription. At some point, a subscriber 104 may contact the subscription module 112 to request this aggregated collection of event descriptors available from the various event producers 101 in the system. In response, the subscription module 112 may transmit 103 the aggregated event descriptor collection to the subscriber 104.

In some embodiments in which a human user makes a subscription selection from among the event descriptors, the subscriber may present a graphical user interface. This user interface may allow a user to select, from the aggregated collection of event descriptors, the events for which the user wishes to have event messages transmitted, the destination of the event messages, and the mechanism by which the event messages are transmitted. Once the user has made this selection, the subscriber 104 may transmit a subscription message 105 to convey the selection to the subscription module 112.

For example, suppose that a software development team includes a project manager M, a programmer P and a requirements analyst R. Suppose further that the system includes two event producers 101: A source code control system and a requirements tracking system. The source code control system transmits to the subscription module 112 event descriptors, each event descriptor corresponding to the modification of one of the source code files in the source code control system. The requirements tracking system transmits to the subscription module 112 an event descriptor corresponding to the modification of the project's requirements document. The subscription module 112 may aggregate these event descriptors and transmit them to the subscriber. When M logs into the subscriber, the subscriber may download the aggregated event descriptors and present them within the context of a GUI to M. M then manipulates the GUI to form a subscription for herself specifying a desire to receive event messages indicating the modification of the more important source code files and to have those event messages transmitted to M's email client. M then further manipulates the GUI to form a second subscription for P, specifying that P should receive event messages indicating the modification of the project's requirements document and that these should be delivered via RSS to P's integrated development environment. (R would typically be responsible for modifying the project's requirements document) These two subscriptions would then be transmitted as a single or alternatively as two separate, subscription messages to the subscription module 112.

In some embodiments, the subscriber and the subscription module 112 may be implemented on the same physical computing device. In some embodiments, the subscriber is configured to automatically produce a subscription message without the need for human input.

When a subscription module 112 receives a subscription message, it typically will, in response, transmit two messages, a notification module subscription message 111 and a producer subscription message 106.

The producer subscription message 106 may include an indication of which event descriptors, of the event descriptors transmitted to the subscription module 112, correspond to events for which event messages are desired to be transmitted, but typically do not include details about where the event messages should be transmitted to or how this transmission is to occur. For example, suppose that an event producer 101 has transmitted 102 event descriptors DA, DB, DC, DD corresponding to events A, B, C, and D. Suppose further that a first user has caused a first subscription message to be received by the subscription module 112 indicating that the first user is interested in receiving event messages corresponding to events A and B. In response, the subscription module 112 may send a producer subscription message indicating interest in event descriptors DA and DB. Suppose that sometime later, a second user has caused a second subscription message to be received by the subscription module 112 indicating that the second user is interested in receiving event messages corresponding to events B and D. In response, the subscription module 112 may send a second producer subscription message indicating interest in event descriptors DB and DD.

If the subscription message 105 indicates event descriptors relating to events from two or more event producers 101, the subscription module 112 may transmit a separate producer subscription message to each event producer 101 from which an indicated event descriptor originated.

The notification module subscription message 111 may include an indication of which event descriptors, of the event descriptors transmitted to the subscription module 112, correspond to events for which event messages are desired to be transmitted, and typically includes details about where the event messages should be transmitted to or how this transmission is to occur. These details allow the notification module 109 to properly multiplex and route 108 the event messages that it receives 107 from an event producer 101 to an event consumer 110.

For purposes of illustration, suppose one user wishes to receive email whenever a particular event producer 101 produces events A or B. Further, suppose a second user wishes to be able to get an RSS message at her browser whenever that same event producer 101 produces events B or C. The notification module 109 in this case may store appropriate data structures and when an event message is sent 107 to the notification module 109, the notification module 109 examines the event message. In this case, if the event message pertained to event A, an email is sent 108 to the event consumer 110, namely a computer running an email program upon which the first person could receive email. On the other hand, if the event message pertained to event B, an email is sent 108 to the event consumer 110, namely a computer running an email program upon which the first person receives email and furthermore, a RSS messages may be stored in the notification module 109 so that in response to a signal from an RSS-enabled web browser running on the second person's computer acting as a second event consumer, the RSS message may be 'pushed' 108 to the second person's computer.

Figure 2:
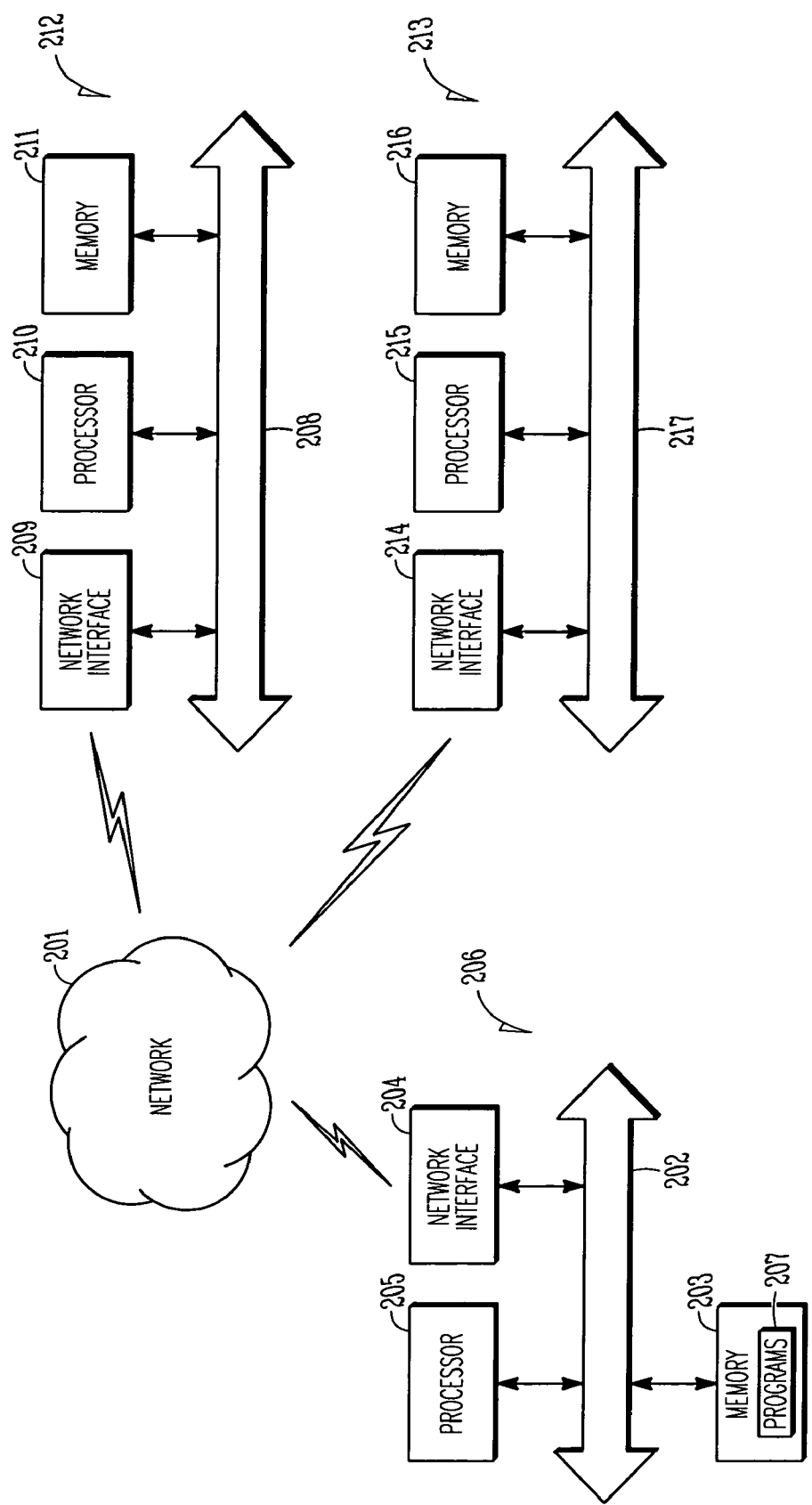
FIG. 2 shows a schematic diagram of machines implementing portions of an event-based information flow in a software development environment, according to an example embodiment.

FIG. 2 illustrates a more hardware-centered view of the example system described above. In this figure, the computer that may host a subscription module 112 is shown at 206, the computer that may host an event consumer at 212 and a computer that may host a notification module 109 at 213. The three computers may communicate via a network 301 and each may include a processor (205, 210, and 215 respectively), a network interface (204, 209, and 214 respectively) and a memory (203, 211, and 216 respectively). These components may be operatively connected by, and communicate by, a bus (202, 208, and 217 respectively). The memory of the computer implementing the subscription module 112 typically contains programs 207 to be executed upon its processor. The other computers typically do as well but are not shown in this diagram.

Figure 3:
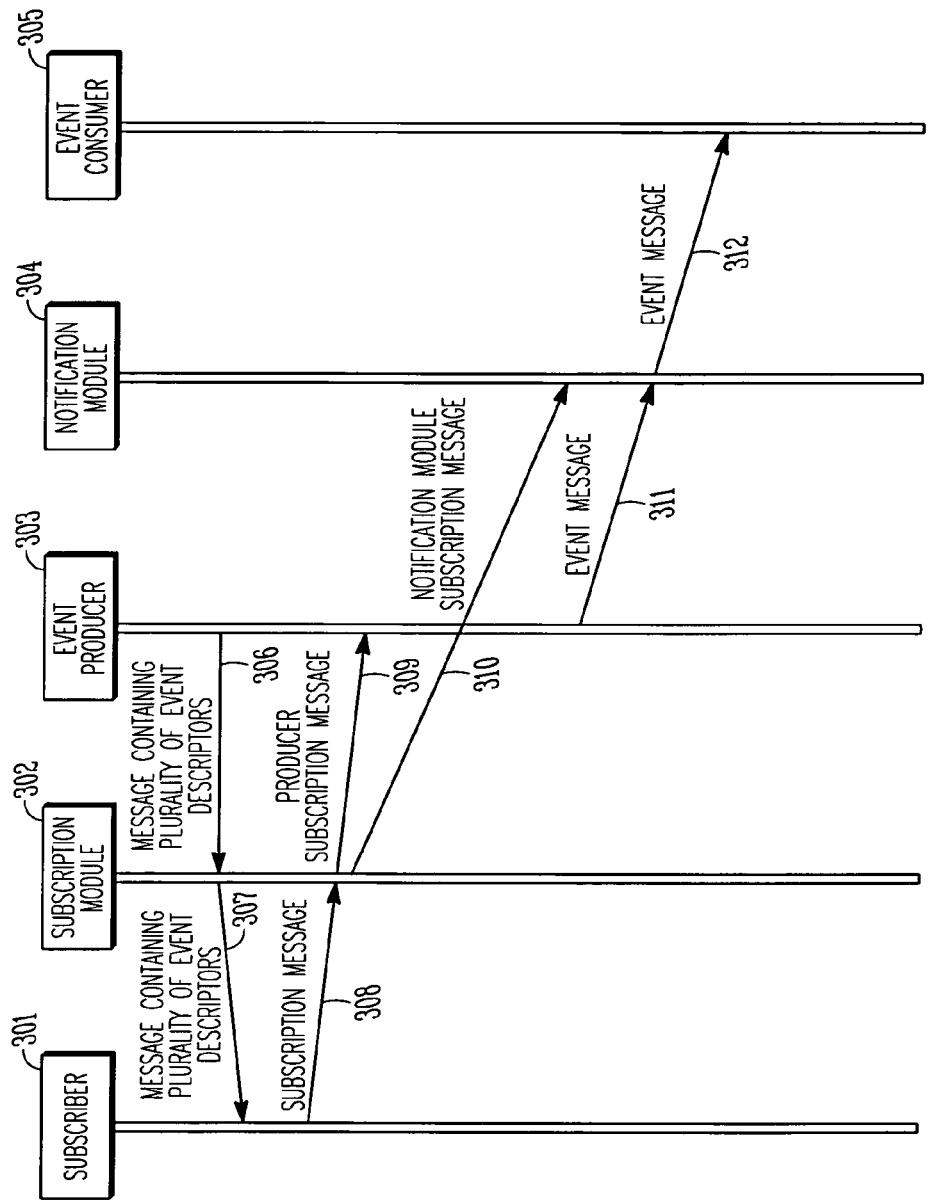
FIG. 3 shows a sequence diagram of communication an interaction among components of the publish/subscribe notification system that implements event-based information flow in a software development environment, according to an example embodiment.

FIG. 3 shows an interaction diagram illustrating temporal interactions of the various modules of the system, according to an example embodiment. In an example embodiment, a message containing a number of event descriptors may be transmitted 306 from an event producer 303 to a subscription module 302. The subscription module 302 may in turn transmit a message 307 containing the plurality of event descriptors (in some embodiments, supplemented by other event descriptors from the same or other event producers) to a subscriber 301. The subscriber 301 (in some embodiments in response to user actions, in other embodiments programmatically) may at some later moment in time transmit a subscription message 308 to the subscription module 302, which may thereafter transmit a notification module subscription message 310 to a notification module 304 and a producer subscription message 309 to the event producer 303, these messages being constructed from the data in the subscription message 308.

In due time, the event producer 303 may transmit an event message 311 to the notification module 109. In response to this event message 311 and in accordance to the delivery preferences specified in the notification module subscription message 310, the event message may be relayed to one or more event consumers 305.

It will be appreciated that the event message 311 transmitted by an event producer 303 in response to the producer subscription message 309 may be received by the notification module 304 prior to receiving the notification module subscription message 310. In that case, it may be advantageous to store this event message in the notification module 109 pending receiving the notification module subscription message 310, or in some embodiments, it may be discarded, or held for only a limited period.

Example Messages Formats

A description of an example embodiment is provided below, in which the various example message flows described above are exemplified as structured documents written in XML. Reference may be had to FIG. 1 for an overview of the message flows mentioned below.

Table 1 and Table 2 depict two examples of structured documents that may be transmitted from event producers 101 to a subscription module 112.

TABLE 1

```
<eventdescriptors>
    <descriptors>
        <descriptor artifact="H:\Files\gsccs\projects\astro\star.java"
    event="modify"></descriptor>
        <descriptor artifact="H:\Files\gsccs\projects\astro\star.java"
    event="delete"></descriptor>
        <descriptor artifact="H:\Files\gsccs\projects\astro\circle.java"
    event="modify"></descriptor>
        <descriptor artifact="H:\Files\gsccs\projects\astro\circle.java"
    event="delete"></descriptor>
        <descriptor artifact="H:\Files\gsccs\projects\astro\*"
    event="createnew"></descriptor>
    </descriptors>
    <eventproducer name="GSCCS v.2.5" ip="123.45.67.89" port="95">
    </eventproducer>
</eventdescritprs>
```

TABLE 2

```
<eventdescriptors>
    <descriptors>
        <descriptor artifact="H:\Files\build\projects\astro"
    event="startBuild"></descriptor>
        <descrptor artifact="H:\Files\build\projects\astro"
    event="finishBuild"></descriptor>
    </descriptors>
    <eventproducer name="BuildMagic v.3.0" ip="123.145.167.89" port="300">
    </eventproducer>
</eventdescritprs>
```

Table 1 illustrates a message, in the example form of a structured document written in XML, which may be transmitted 102 from an event producer 101 to a subscription module 112. This structured document includes several event descriptors corresponding to events relevant to a software development process, placed between the <descriptors> tags. Each individual descriptor, set off with <descriptor> tags, includes an artifact, in this case a file path and file name, and an event. For example, an event producer 101 that might have transmitted the document of Table 1 indicates that one event it can send messages corresponding to is the deletion of the source code file star.java. That event producer 101 would also be able to send an event message to indicate the creation of a new source code file in the H:\Files\gsccs\projects\astro\* directory. In addition to the event descriptors, the structured document of Table 1 also provides information about the event producer 101 that can provide messages corresponding to the event descriptors: the name of the event producer 101 is "GSCCS v.2.5" and the IP address and port number that can be used to communicate with that event producer 101, which may be used, for example, to transmit a producer subscription message 106 to the event producer 101, are also provided. In some embodiments, some other mechanism may be provided for transmitting producer subscription message, such as writing the producer subscription message into a file that the event producer 101 can then read. In those embodiments, other information may be provided in the message of Table 1 to facilitate transmission of producer subscription messages and the like to the event producer 101.

Table 2 illustrates a similar example structured document, as it may be transmitted from another type of event producer 101, according to an example embodiment. The structured document of Table 2 may be transmitted from a software build tool. It will be noted that in contrast to Table 1, the event producer 101 (named "buildMagic v.3.0" in this example) includes event descriptors corresponding to the start and end of a build process occurring in a particular project build director (H:\Files\build\projects\astro). Typically the format and content of the event descriptors found in the structured documents transmitted 102 to the subscription module 112 depend on the event producer 101 to which the structured document pertains.

Such structured documents as shown in Table 1 and Table 2, may, in some embodiments, be transmitted from the event producer 101 to a subscription module 112. In other embodiments, the transmitter of such structured documents may be a separate module rather than an event producer 101.

In some embodiments, the subscription module 112 may store the content of the structured documents exemplified in Tables 1 and 2. In response to some type of request from a subscriber 104, the subscription module 112 may transmit 103 a structured document to the subscriber 104. This structured document, as it may appear if a subscription module 112 had received the structured documents of Table 1 and 2, is presented in Table 3.

TABLE 3

```
<eventdescriptors>
    <eventproducer name=="GSCCS v.2.5">
        <desscriptors>
            <eventdescriptor artifact="H:\Files\gsccs\projects\astro\star.java"
        event="modify"></eventdescriptor>
            <eventdescriptor artifact="H:\Files\gsccs\projects\astro\star.java"
        event="delete"></eventdescriptor>
            <eventdescriptor artifact="H:\Files\gsccs\projects\astro\circle.java"
        event="modify"></eventdescriptor>
            <eventdescriptor artifact="H:\Files\gsccs\projects\astro\circle.java"
        event="delete"></eventdescriptor>
            <eventdescriptor artifact="H:\Files\gsccs\projects\astro\*"
        event="createnew"></eventdescriptor>
        </descriptors>
    </eventproducer>
    <eventproducer name="BuildMagic v.3.0">
        <descriptors>
            <eventdescriptor artifact="H:\Files\build\projects\astro"
        event="startBuild"></eventdescriptor>
            <eventdescriptor artifact="H:\Files\build\projects\astro"
        event="finishBuild"></eventdescriptor>
        </descriptors>
    </eventproducer>
</eventdescritprs>
```

It will be observed that the structured document of Table 3 includes two <eventproducer> blocks, each such block delineated by paired <eventproducer></eventproducer> tags. In some embodiments, each event producer block may include a 'name' attribute specifying the name of the event producer 101 that can send event messages corresponding to the event descriptors in the <eventproducer> block. The event descriptors corresponding to events detected or created by the event producer 101 of that name may be nested within the <eventproducer> block. In some embodiments, the subscriber 104 may use a structured document such as that shown in Table 3 to create a GUI to allow the user to select the event messages that she wishes to have the event producers 101 transmit when the corresponding events occur. In other embodiments, the subscriber may process a structured document such as that of Table 3 in an automated manner without user input and thereby select the event messages of interest.

Table 4 illustrates a structured document transmitted as a subscription message 105 from the subscriber 104 to the subscription module 112, according to an example embodiment.

TABLE 4

```
<subscriptionmessage>
    <eventproducer name=="GSCCS v.2.5">
        <desscriptors>
            <eventdescriptor artifact="H:\Files\gsccs\projects\astro\star.java"
    event="modify" subscribe="yes"></eventdescriptor>
            <eventdescriptor artifact="H:\Files\gsccs\projects\astro\star.java"
    event="delete" subscribe="yes"></eventdescriptor>
            <eventdescriptor artifact="H:\Files\gsccs\projects\astro\circle.java"
    event="modify" subscribe="no"></eventdescriptor>
            <eventdescriptor artifact="H:\Files\gsccs\projects\astro\circle.java"
    event="delete" subscribe="no"></eventdescriptor>
            <eventdescriptor artifact="H:\Files\gsccs\projects\astro\*"
    event="createnew" subscribe="yes"></eventdescriptor>
        </descriptors>
    </eventproducer>
    <eventproducer name="BuildMagic v.3.0">
        <descriptors>
            <eventdescriptor artifact="H:\Files\build\projects\astro"
    event="startBuild" subscribe="no"></eventdescriptor>
            <eventdescriptor artifact="H:\Files\build\projects\astro"
    event="finishBuild" subscribe="yes"></eventdescriptor>
        </descriptors>
    </eventproducer>
    <messagedelivery ip="145.7.38.111" port="900" mode="push"
expiration="2006-01-11 14:23:32"
deliveryhold="72 hours"></messagedelivery>
</subscriptionmessage>
```

A comparison of Table 4 with Table 3 is useful. It will be noted that Table 4's root tag is a <subscriptionmessage></subscriptionessage> pair. In addition each event descriptor includes a 'subscribe' attribute, indicating whether event messages corresponding to the event described by that event descriptor have been selected by the subscriber. Finally, a <messagedelivery> tag is present. In the example of Table 4, the message delivery tag includes attributes that specify the IP address and port to which event messages 108 should be delivered (typically identifying the event consumer 110), a mode attribute to indicate whether, for example, event messages 108 are to be "pushed" by the notification module 109 to the event consumer 110, or "pulled" (i.e. sent in response to some request from the event consumer). In the example of Table 4, the message delivery tag also includes a subscription expiration timestamp, after which time event messages corresponding to the selected event descriptors should no longer be sent to the event consumer. The message delivery tag illustrated in Table 4 further includes a 'deliveryhold' attribute specifying how long an event message 107 transmitted by an event producer 101 should be held by a notification module 109 in case initial attempts to transmit 108 the event message are unsuccessful.

Many variations in the syntax for subscription messages besides that exemplified in Table 4 are possible. For example, in some embodiments, an email address to which event messages should be emailed may be included. In other embodiments a log file could be specified. In some embodiments, the information shown as part of the <messagedelivery> tag may be associated with each event descriptor, thereby allowing a single subscription message to specify various delivery methods for the event messages corresponding to an event descriptor. In come other embodiments, multiple subscription messages may be transmitted, one for each event producer 101 from which event descriptors have been received. Many other techniques for creating and formatting a subscription message are possible and will be apparent to those skilled in the art.

In response to the reception of a subscription message 105, the subscription module 112 may transmit a suitable producer subscription message 106 to each event producer 101 whose event descriptors are indicated in the subscription message 105. In further response to the reception of the subscription message 105, the subscription module 112 may transmit a suitable notification module subscription message 111 to a notification module 109. The producer subscription message 106 and the notification module subscription message 111 may be transmitted as structured documents.

It will be appreciated that the notification module subscription message 111 may, in some embodiments, be identical the subscription message 105, although strictly speaking it contains some information, such as, for example, the expiration timestamp of the subscription, that may not be needed by the notification module 109 since expirations can be entirely managed by event producers 101 as described below. In some embodiments, these notification module subscription messages 111 will be retained within the notification module 109 for later use in multiplexing and routing event messages 107 to event consumers 110. In other embodiments, sufficient information may be extracted from the notification module subscription messages to enable the notification module 109 to multiplex and route event messages 107 that the actual notification module subscription messages 111 need not be retained.

The subscription module 112 may create, in response to, and from the information contained in, the subscription message 105, a producer subscription message 106 for each event producer 101 for which event descriptors are mentioned in the subscription message 105. Table 5a and Table 5b illustrate examples of structured documents that may be transmitted as producer subscription messages 106 to two event producers 101 in response to the reception by a subscription module 112 of the subscription message 105 illustrated in Table 4.

TABLE 5a

```
<producersubscriptionmessage>
    <eventproducer name=="GSCCS v.2.5">
        <desscriptors>
            <eventdescriptor artifact="H:\Files\gsccs\projects\astro\star.java"
    event="modify" subscribe="yes"></eventdescriptor>
            <eventdescriptor artifact="H:\Files\gsccs\projects\astro\star.java"
    event="delete" subscribe="yes"></eventdescriptor>
            <eventdescriptor artifact="H:\Files\gsccs\projects\astro\circle.java"
    event="modify" subscribe="no"></eventdescriptor>
            <eventdescriptor artifact="H:\Files\gsccs\projects\astro\circle.java"
    event="delete" subscribe="no"></eventdescriptor>
            <eventdescriptor artifact="H:\Files\gsccs\projects\astro\*"
    event="createnew" subscribe="yes"></eventdescriptor>
        </descriptors>
    </eventproducer>
    <messagedelivery expiration="2006-01-11 14:23:32"></messagedelivery>
</producersubscriptionmessage>
```

TABLE 5b

```
<producersubscriptionmessage>
    <eventproducer name="BuildMagic v.3.0">
        <descriptors>
            <eventdescriptor artifact="H:\Files\build\projects\astro"
    event="startBuild" subscribe="no"></eventdescriptor>
            <eventdescriptor artifact="H:\Files\build\projects\astro"
    event="finishBuild" subscribe="yes"></eventdescriptor>
        </descriptors>
    </eventproducer>
    <messagedelivery expiration="2006-01-11 14:23:32"></messagedelivery>
</producersubscriptionmessage>
```

It will be observed that in contrast to the subscription message 105, the example producer subscription message 106 structured documents of Table 5a and 5b each contain only event descriptors (with indications as to which events a subscriber has desired to have reported as event messages) applicable to the specific event producer 101 that is the intended recipient of the document. The root tag of these documents will be observed to be the tag pair <producersubscriptionmessage></producersubscriptionmessage> and each includes only a subscription expiration timestamp attribute in their messagedelivery tags. This is because it may be the responsibility of the notification module 109, rather than each event producer 101, to multiplex and route event messages 107 to the appropriate event consumer 110. In some embodiments, routing information to enable an event producer 101 to transmit event messages 107 to a notification module 109 may be included in a producer subscription message 106. In some other embodiments, a system administrator or other user may configure each event producer 101 so that it automatically routes all event message 107 to a notification module 109. Other routing configurations are possible as well as will present themselves in the implementation of the system 100.

Once an event producer 101 has been apprised of the existence of interest in particular events that it detects or causes, the event producer 101 may send an event message to a suitable notification module 109. Such an event message 107 may be transmitted as a structured document, an example of which is illustrated by Table 6. It will be observed that the example message includes the type of the event, the identity of the artifact relevant to the event (if applicable), the identity of the event producer 101, a universal message id (generated by, for example a GUID), information may be included in the event message 107, such as descriptive text providing further explanation of the event, the user or process that initiated the event, reference to another event that caused the event, error condition reports, or the like.

TABLE 6

```
<eventmessage
universalID=
"4JGF86NRNBVM84HBGF83N6364GDU943MV90KKL89">
    <event artifact="H:\Files\build\projects\astro" event="startBuild"
timestamp="2007-12-19 23;12:05" eventproducername="BuildMagic
v.3.0"></event>
</eventmessage>
```

Having received an event message 107 (such as, for example, in the form of a structured document as illustrated in Table 6), a notification module 109 (in accordance with the notification module subscription messages 111 it has received) may multiplex and route the event message 107 into as many event message copies 108 as needed to fulfill the various subscriptions. The notification module 109 may also add a timestamp indicating the time of its own reception of the event message 107. As mentioned above, this routing process may occur in various ways, such as the retention of event messages 108 in an RSS server for "pull" retrieval by an event consumer 110, or by using a "push" mechanism such as, for example, email or socket communications. The notification module 109 may retain event message 107 until routing has successfully occurred, or until the time of the largest value of the 'deliveryhold' attribute of any subscription for that event message elapses since the event message 107 was received by the notification module 109.

Subscription and Event Message Processing Methods

This section presents details of methods used in example embodiments for processing the various message flows described above.

In example embodiments, it may be advantageous for an event producer 101 to receive numerous producer subscription messages 106, each producer subscription message 106 including numerous indicated event descriptors of interest to a subscriber 104, and in some embodiments, a different expiration timestamp for each indicated event descriptor.

Because it is inefficient for an event producer 101 to transmit and event message 107 for which there are no event consumers 110 interested in the corresponding event, or because all subscriptions in which the corresponding event descriptor is selected have passed their expiration timestamp, it may be advantageous for an event producer 101 to store a data structure in which each event descriptor is associated with a series of expiration timestamps. Such a data structure is described here.

In an initial condition, the data structure may associate an empty list with each event descriptor that corresponds to an event that the event producer 101 is able to detect or cause. Whenever a producer subscription message 106 is received by the event producer 101, each selected event descriptor in the producer subscription message 106 may have its associated expiration timestamp added to the list of timestamps associated with the corresponding event descriptor stored in the data structure. The list of timestamps associated with the corresponding event descriptor stored in the data structure may be kept in sorted order. When the event producer 101 detects an event occurrence that corresponds to one of the event descriptors for which it able to report an event message, the event producer 101 may first compare the current timestamp with the expiration timestamps in the list associated with the event descriptor corresponding to the event detected and prune out those timestamps (if any) that have already passed. If no timestamps remain in the list after this pruning, the event producer 101 need not transmit an event message 107 to report the occurrence of the event. In some embodiments, such as those in which a producer subscription message 106 of the form shown in Table 5a or 5b is employed, the expiration timestamp associated with the entire producer subscription message 106, duplicate copies of the single expiration timestamp may be inserted into all the timestamp lists associated with all the event descriptors within the entire producer subscription message 106 that are indicated therein.

Although the transmission 102 of a structured document containing the various event descriptors corresponding to events that a particular event producer 101 can detect or cause and report by transmission of event messages 107 is described above for simplicity as if it were a one-time occurrence, it may be the case that at one moment in time an event producer 101 may be able to detect or cause different events than at another moment in time. Thus, over the course of one or more executions of an event producer 101 it may be desirable, in some embodiments, to transmit 102 sets of event descriptors to provide updates to a subscription module 112 and afford subscribers the opportunity to request event messages corresponding to those event descriptors. For example, a source code control system acting as an event producer 101 may initially track events with respect to files in a file folder A. Later, a developer may create a new file folder B and have the event producer 101 track events with respect to files in folder B. In that case, new event descriptors (corresponding, for example, to the modification or deletion of files in file folder B) may be transmitted 102 to a subscription module 112 and thus made available for subscription by a subscriber 104. In some embodiments, an event producer 101 may transmit 102 a new set of event descriptors whenever a previously available event descriptors is no longer available or a new event descriptor becomes available. In that case, the subscription module 112 may replace its internal stored representation of the available event descriptors for the event producer 101 with the new set. In other embodiments, update messages according to a protocol may be exchanged between an event producer 101 and a subscription module 112 to keep the internal stored representation of the event producer 101's available event descriptors synchronized with the actual events that the event producer 101 can detect or cause and for which event messages 107 are transmissible.

It may be advantageous for a user to update a subscription. One example of a situation in which this may occur is when a new document is created within a requirements tracking system. A programmer may have already used a subscriber 104 to indicate an interest in receiving event messages 108 from the requirements tracking system, in particular event messages indicating that a new requirements document has been added. When the programmer (via, for example, an email message transmitted to an event consumer 110 that a user logs into to retrieve email) is alerted to a new document in the requirements tracking system, the programmer may use a subscriber to update her subscription to receive email messages indicating changes or deletions of the new requirements document. It will be appreciated that even if the set of event descriptors available does not change, a user may still wish to modify her subscription.

In some embodiments, such a subscription update may be accomplished by the user (e.g. the programmer) logging into the subscriber 104, whereupon the subscriber 104 may request and receive 103 a structured document including the most current set of event descriptors available from the various event producers 101 as described above.

In the case in which a user already has a subscription in place, the subscription module 112 may transmit 103 a structured document to the subscriber similar to that of Table 4, above. To create this document, the subscription module 112 may retrieve the data contained in the user's previously transmitted subscription message, and modify it according to the current set of event descriptors provided to describe events for which event messages are available from the various event producers 101. In some embodiments, the actual previously transmitted subscription message may be stored as a structured document by the subscription module 112. In those embodiments, a copy of the previous subscription message may be created and the copy modified to remove event descriptors that no longer correspond to events detectable or caused by an event producer 101 in the system, and to add event descriptors that correspond to event messages that are now available from the event producers 101 with their 'subscribe' attribute set to no.

The transmission of a merged structured document of the type described above to a subscriber may be advantageous in that it allows a user to use a GUI hosted by the subscriber 104 in an efficient manner, since most of the user's previous subscription is already encapsulated in the structured document and the GUI can be configured, on presentation to the user, to reflect those previously selected event descriptors, message delivery data, and the like. Moreover, upon further modification by the user via the GUI, the structured document can be transmitted 105 as a new subscription message to the subscription module 112, with producer subscription message(s) 106 and notification module subscription messages 111 reflecting the updated subscription easily produced and transmitted. In some embodiments, when a notification module 109 receives a notification module subscription message 111 in which the message delivery data is such as to indicate that it is to replace a previous subscription, the notification module 109 may replace its stored representation of the data of the previous notification module subscription message 111 with the data of the new message.

Discussion of Example Software Components as Event Producers

Throughout this specification examples of tools useful in software development processes are mentioned in reference to the ability of those tools to serve as event producers 101 within the event-based information flow system. Below, a number of tools are discussed in detail with reference to the kinds of event messages (and correspondingly, event descriptors) that they may be able to detect or cause and in response to which they may subsequently transmit event messages 107. It will be appreciated that this description is by no means exhaustive and many other tools useful in software development may also be modified to participate in the system as event producers 101.

In some embodiments, an operating system (or the portion of an operating system that is responsible for file system management) may serve as an event producer 101. Event descriptors provided for events that an operating system may detect or cause in that capacity may include the creation of a new file, the modification of an existing file, the deletion of an existing file, the creation, deletion, or content change of a file folder, or the like. Since a large software development project may include hundreds of files, in some embodiments, it may be desirable to not transmit 102 event descriptors corresponding to each type of event for each file, but rather to transmit 102 only event descriptors corresponding to modification of the content of a file folder. In such an embodiment, a data field in the event messages 107 and 108 may indicate which file within the folder had been modified, created, or deleted.

In some embodiments, a database system may serve as an event producer 101. Event descriptors provided for events that a database system may detect or cause in that capacity may include the creation of a new database table, deletion of a database table, modification of a database table with respect to one of its rows, modification or update of a specific row in a database table, deletion of a specific row in a database table, insertion of a new row into a database table, the receiving or a query, the processing of a query, the result generation in response to a query, the modification of a collection of database tables in the aggregate, or the like. It will be appreciated that databases may be of great value in software development processes because they may provide, among other things, the ability to store information about the state of various software development artifacts and tasks, such as, for example, the team members who are working on those artifacts and tasks and the status and degree of completeness of those tasks. This may give members of the team an especially valuable (and, in some embodiments, temporal data-rich) structured information resource that may be of great utility in managing and coordinating a software development process.

In some embodiments, a source code control system (SCCS) may serve as an event producer 101. Event descriptors provided for events that a SCCS may detect or cause in that capacity may include the importation of s source code or other file into its repository, the updating of such a file, the removal or deletion of such a file, the application or removal of tags, the creation or removal of branches in the software development process, or other tasks carried out by source code control systems or the like. In some embodiments, event descriptors could include those provided for events relating to updating, removal, importation or other operations with respect to system components or modules managed by a SCCS. Similarly to an operating system, in some embodiments it may be desirable to provide event descriptors and corresponding event messages with regard to individual files under management by the SCCS; in other embodiments it may be found to be more practical to provide event descriptors and corresponding event messages only with respect to file folders or directories managed by the SCCS with details about exactly which file the event message refers to provided in a data field in the event message. This procedure may be useful when the number of individual files is large and the task of selecting all the individual files of interest to a user from a GUI hosted on a subscriber 104 may be cumbersome, and maintaining subscriptions when many individual files are being added may be tedious for uses who wish to simply monitory the events with regard to all the (possibly numerous) files with a file folder or entire project managed by and SCCS.

In some embodiments, a software development environment (or integrated development environment, IDE) may serve as an event producer 101. Event descriptors provided for events that a software development environment may detect or cause in that capacity may include the creation, modification, or deletion of project configuration files, the publishing of a web page or web site, the starting or stopping of a web server, the start or end of a compilation of a source code file or a group of source code files, the creation of a static or dynamic library, the creation, recreation, or deletion of object files or other events. In some embodiments, event descriptors provided for events that a software development environment may detect or cause may include various user-centric actions, such as, for example, the completion of a development task by a user in accordance with a particular software requirement, a user locking or unlocking a software artifact to allow the user the exclusive ability to modify that artifact, or the completion of a software project task in satisfaction of a list of tasks, perhaps maintained by a project management system.

In some embodiments, a file or data transfer software tool may serve as an event producer 101. Event descriptors provided for events that a file transfer tool may detect or cause in that capacity may include the completion of some pre-transfer processing or other task by a user or other team member, the initiation of a file or project transfer, the connection to a remote machine able to receive a transferred file, project, or group of files, the successful transfer of a file, project or group of files, the unsuccessful transfer of a file or project, or the like. In some embodiments, the set of event descriptors for the events caused or created by a file transfer tool may not include event descriptors corresponding to every possible file transferable, but instead the set of event descriptors may be groups in some other way, such as for example, the group may include one or more descriptors corresponding to each user with permission to initiate a file transfer. In those embodiments, the identification of the specific file(s) transferred may be provided in the resulting event message. In some embodiments, the resulting event message may also include the location or machine to which the file was transferred.

In some embodiments, a software build tool may serve as an event producer 101. Event descriptors provided for events that a software build tool may detect or cause in that capacity may include various types of events within a build process, such as the start of a build process, the end of a build process, the creation of a new build configuration file, the occurrence of an error or exception during a build process, or the like. In some embodiments, the event descriptors corresponding to these events may include an indication of the particular project able to be built by the build process as well as the specific event type to which the descriptor corresponds.

In some embodiments, a model transformation tool may serve as an event producer 101. Event descriptors provided for events that a model transformation tool may detect or cause in that capacity may include various types of events, such as the start of a model transformation, the end of a model transformation, the creation of a new model, the deletion of a model, the occurrence of an error, failure, or exception during a model transformation process, the occurrence or discovery of faults, errors, or inconsistencies during model transformation, evaluation, or other processing, the determination during model processing or transformation of whether all model constraints have been met, or the like. In some embodiments, the event descriptors corresponding to these events may include an indication of the particular model able to be manipulated by the model transformation tool as well as the specific event type to which the descriptor corresponds.

In some embodiments, a requirements tracking system may serve as an event producer 101. In some embodiments, requirements tracking systems may store or present requirements in a hierarchical or mesh-based representation. Event descriptors provided for events that a requirements tracking system may detect or cause in that capacity may include the creation of a requirement, the deletion of a requirement, the updating of a requirement, the creation, modification, or deletion of a dependency among two or more requirements, the detection of an error or inconsistency within a requirements structure, the creation of a requirements document, the deletion of a requirements document, the updating of a requirements document, or the like. In some embodiments, a requirements tracking system may store requirements documents or information as separate files that event descriptors may pertain to. In other embodiments, requirements information may be stored in a structured file or directory structure and event descriptors may pertain to individual parts of the directory tree.

In some embodiments, a software project management system may serve as an event producer 101. Event descriptors provided for events that a software project management system may detect or cause in that capacity may include the creation of a piece of project management information, the deletion of a piece of project management information, the updating of a piece of project management information, the creation of a software design document, the deletion of a software design document, the updating of a software design document, or the like. In some embodiments, a requirements tracking system may store requirements documents or information as separate files that event descriptors may pertain to. In other embodiments, requirements information may be stored in a structured file or directory structure and event descriptors may pertain to individual parts of the directory tree.

Figure 4:
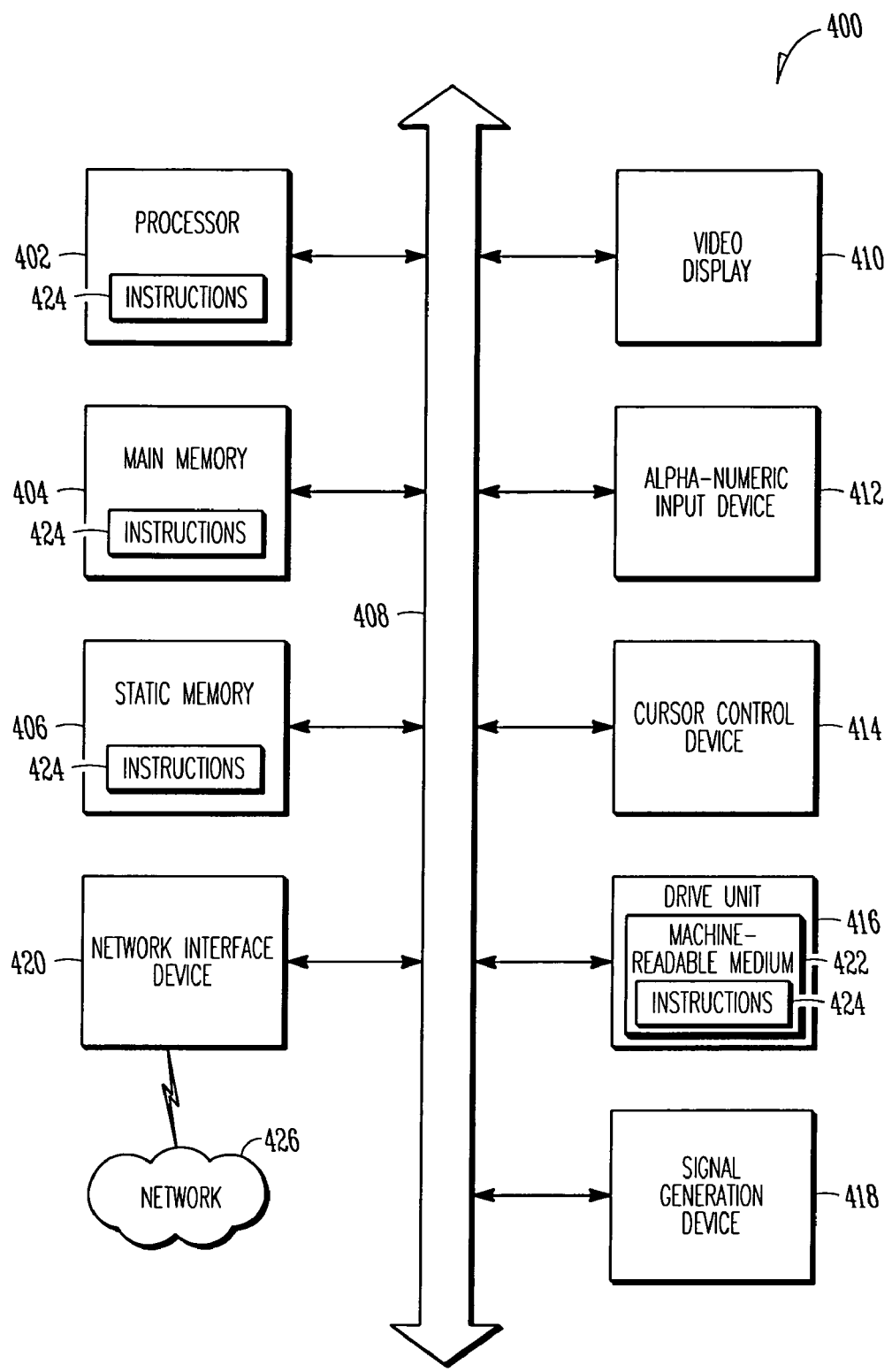
FIG. 4 shows a diagrammatic representation of machine in the example form of a computer system within which a set of instructions, for causing the machine to perform any one or more of the methodologies discussed herein, may be executed.

FIG. 4 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving a first plurality of event descriptors from a first event producer, each event descriptor of the first plurality of event descriptors corresponding to a respective event relevant to a software development process, the respective event occurring at the first event producer;
receiving a second plurality of event descriptors from a second event producer, each event descriptor of the second plurality of event descriptors occurring at the second event producer;
transmitting the first plurality of event descriptors and the second plurality of event descriptors to a subscriber;
receiving a subscription message from a subscriber, the subscription message including an indication of a first event descriptor selected from the first plurality of event descriptors and a second event descriptor selected from the second plurality of event descriptors; and
transmitting a first producer subscription message to the first event producer, the first producer subscription message including an indication of the first event descriptor, and transmitting a second producer subscription message to the second event producer, the second producer subscription message including an indication of the second event descriptor, the first producer subscription message including an expiration timestamp indicating an expiration of a subscription initiated based on the first producer subscription message.

2. The method of claim 1, wherein the subscription message further includes an identification of an event consumer.

3. The method of claim 2 further comprising transmitting a notification module subscription message to a notification module, the notification module subscription message including (a) an identification of the event consumer and (b) an identification of the first event descriptor and the second event descriptor included in the subscription message.

4. The method of claim 1 wherein the first plurality of event descriptors includes another event descriptor corresponding to a modification of a file system.

5. The method of claim 1 wherein the first plurality of event descriptors includes another event descriptor corresponding to a modification of a database table.

6. The method of claim 1 wherein the first plurality of event descriptors includes another event descriptor corresponding to a modification of a collection of database tables.

7. The method of claim 1 wherein the first plurality of event descriptors includes another event descriptor corresponding to a modification of the content of a source code control system repository.

8. The method of claim 1 wherein the first plurality of event descriptors includes another event descriptor corresponding to a modification of a software development environment with respect to an artifact controlled by the software development environment.

9. The method of claim 1 wherein the first plurality of event descriptors includes another event descriptor corresponding to a transmission of a file between computers.

10. The method of claim 1 wherein the first plurality of event descriptors includes another event descriptor corresponding to an occurrence of an event within a software build process.

11. The method of claim 1 wherein the first plurality of event descriptors includes another event descriptor corresponding to an occurrence of an event within a software model transformation process.

12. The method of claim 1 wherein the first plurality of event descriptors includes another event descriptor corresponding to a modification of a file system with respect to a file, the file being useable by a software requirements tracking system for storing requirements information.

13. The method of claim 1 wherein the first plurality of event descriptors includes another event descriptor corresponding to a modification of a file system with respect to a file, the file being useable by a software project management system for storing software project information.

14. A method comprising:
receiving at an event producer, from a subscription module, a producer subscription message, the producer subscription message including an indication of an event descriptor selected from a plurality of event descriptors, each event descriptor of the plurality of event descriptors corresponding to a respective event relevant to a software development process, the producer subscription message including an expiration timestamp indicating an expiration of a subscription initiated based on the producer subscription message.

15. A machine comprising:
a network interface; and
a processor programmed to:
receive a first plurality of event descriptors from a first event producer via the network interface, each event descriptor of the first plurality of event descriptors corresponding to a respective event relevant to a software development process, the respective event occurring at the first event producer;
receive a second plurality of event descriptors from a second event producer via the network interface, each event descriptor of the second plurality of event descriptors occurring at the second event producer;
transmit the first plurality of event descriptors and the second plurality of event descriptors to a subscriber via the network interface;
receive a subscription message from a subscriber via the network interface, the subscription message including an indication of a first event descriptor selected from the first plurality of event descriptors and a second event descriptor selected from the second plurality of event descriptors; and
transmit a first producer subscription message to the first event producer via the network interface, the first producer subscription message including an indication of the first event descriptor, and transmit a second producer subscription message via the network interface to the second event producer, the second producer subscription message including an indication of the second event descriptor, the first producer subscription message including an expiration timestamp indicating an expiration of a subscription initiated based on the first producer subscription message.

16. The machine of claim 15 wherein the subscription message further includes an indication of an event consumer.

17. The machine of claim 16 wherein the processor is further programmed to transmit a notification module subscription message to a notification module via the network interface, the notification module subscription message including (a) an indication of the event consumer and (b) an indication of the first event descriptor and the second event descriptor included in the subscription message.

18. A machine comprising:
a network interface; and
a processor programmed to receive via the network interface at an event producer, from a subscription module, a producer subscription message, the producer subscription message including an indication of an event descriptor selected from a plurality of event descriptors, each event descriptor of the plurality of event descriptors corresponding to a respective event relevant to a software development process, the producer subscription message including an expiration timestamp indicating an expiration of a subscription initiated based on the producer subscription message.

19. A system comprising:
a processor-implemented subscription module to:
receive a first plurality of event descriptors from a first event producer, each event descriptor of the first plurality of event descriptors corresponding to a respective event relevant to a software development process, the respective event occurring at the first event producer;
receive a second plurality of event descriptors from a second event producer, each event descriptor of the second plurality of event descriptors occurring at the second event producer;
transmit the first plurality of event descriptors and the second plurality of event descriptors to a subscriber;
receive a subscription message from a subscriber, the subscription message including an indication of a first event descriptor selected from the first plurality of event descriptors and a second event descriptor selected from the second plurality of event descriptors; and
transmit a first producer subscription message to the first event producer, the first producer subscription message including an indication of the first event descriptor, and transmit a second producer subscription message to the second event producer, the second producer subscription message including an indication of the second event descriptor, the first producer subscription message including an expiration timestamp indicating an expiration of a subscription initiated based on the first producer subscription message.

20. The system of claim 19 wherein the subscription message further includes an identification of an event consumer.

21. The system of claim 19 wherein the subscription message further includes an indication of an event consumer and the subscription module is further to transmit a notification module subscription message to a notification module, the notification module subscription message including (a) an identification of the event consumer and (b) an indication of the first event descriptor and the second event descriptor included in the subscription message.

22. A system comprising:
means for receiving a first plurality of event descriptors from a first event producer, each event descriptor of the first plurality of event descriptors corresponding to a respective event relevant to a software development process, the respective event occurring at the first event producer;
means for receiving a second plurality of event descriptors from a second event producer, each event descriptor of the second plurality of event descriptors occurring at the second event producer;
means for transmitting the first plurality of event descriptors and the second plurality of event descriptors to a subscriber;
means for receiving a subscription message from a subscriber, the subscription message including an indication of a first event descriptor selected from the first plurality of event descriptors and a second event descriptor selected from the second plurality of event descriptors; and
means for transmitting a first producer subscription message to the first event producer, the first producer subscription message including an indication of the first event descriptor, and means for transmitting a second producer subscription message to the second event producer, the second producer subscription message including an indication of the second event descriptor, the first producer subscription message including an expiration timestamp indicating an expiration of a subscription initiated based on the first producer subscription message.

23. The system of claim 22 wherein the subscription message further includes an identification of an event consumer.

24. The system of claim 22 wherein the subscription message further includes an indication of an event consumer and the subscription module has means for transmitting a notification module subscription message to a notification module, the notification module subscription message including (a) an identification of the event consumer and (b) an indication of the first event descriptor and the second event descriptor included in the subscription message.

25. A non-transitory computer-readable storage medium embodying instructions, which when executed by machine, cause the machine to perform operations comprising:
receiving a first plurality of event descriptors from a first event producer, each event descriptor of the first plurality of event descriptors corresponding to a respective event relevant to a software development process, the respective event occurring at the first event producer;
receiving a second plurality of event descriptors from a second event producer, each event descriptor of the second plurality of event descriptors occurring at the second event producer;
transmitting the first plurality of event descriptors and the second plurality of event descriptors to a subscriber;
receiving a subscription message from a subscriber, the subscription message including an indication of a first event descriptor selected from the first plurality of event descriptors and a second event descriptor selected from the second plurality of event descriptors; and
transmitting a first producer subscription message to the first event producer, the first producer subscription message including an indication of the first event descriptor, and
transmitting a second producer subscription message to the second event producer, the second producer subscription message including an indication of the second event descriptor, the first producer subscription message including an expiration timestamp indicating an expiration of a subscription initiated based on the first producer subscription message.

26. The non-transitory computer-readable storage medium of claim 25 wherein the subscription message further includes an identification of an event consumer.

27. The non-transitory computer-readable storage medium of claim 26, further embodying instructions, which when executed by machine, cause the machine to perform operations comprising:
transmitting a notification module subscription message to a notification module, the notification module subscription message including (a) an identification of the event consumer and (b) an identification of the first event descriptor and the second event descriptor included in the subscription message.

28. A non-transitory computer-readable storage medium embodying instructions, which when executed by machine, cause the machine to perform operations comprising:
receiving at an event producer, from a subscription module, a producer subscription message, the producer subscription message including an indication of an event descriptor selected from a plurality of event descriptors, each event descriptor of the plurality of event descriptors corresponding to a respective event relevant to a software development process, the producer subscription message including an expiration timestamp indicating an expiration of a subscription initiated based on the producer subscription message.

* * * * *